United States Patent
O'Gorman et al.

(10) Patent No.: US 8,466,646 B2
(45) Date of Patent: Jun. 18, 2013

(54) APPARATUS AND METHOD FOR DETERMINING ANGULAR POSITION

(75) Inventors: Patrick A. O'Gorman, Grayslake, IL (US); Rene Vivanco, Johns Creek, GA (US); Alex Kurnia, Lake Zurich, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 279 days.

(21) Appl. No.: 13/031,326

(22) Filed: Feb. 21, 2011

(65) Prior Publication Data

US 2011/0248658 A1 Oct. 13, 2011

Related U.S. Application Data

(63) Continuation-in-part of application No. 12/061,635, filed on Apr. 2, 2008, now Pat. No. 7,915,888.

(51) Int. Cl.
  *H02P 6/18* (2006.01)
(52) U.S. Cl.
  CPC ..................... *H02P 6/182* (2013.01)
  USPC ....... 318/400.32; 318/603; 318/605; 318/801
(58) Field of Classification Search
  CPC ...................................... H02P 6/182
  USPC .............. 318/400.32, 603, 605, 801
  See application file for complete search history.

(56) References Cited

U.S. PATENT DOCUMENTS

| | | |
|---|---|---|
| 4,285,240 A | 8/1981 | Gold |
| 4,295,085 A | 10/1981 | Lafuze |
| 4,786,891 A | 11/1988 | Ueda et al. |
| 4,978,895 A | 12/1990 | Schwarz |
| 4,992,716 A | 2/1991 | Ellis |
| 5,140,245 A | 8/1992 | Stacey |
| 5,378,976 A * | 1/1995 | Inaji et al. ..................... 318/810 |
| 5,461,293 A | 10/1995 | Rozman et al. |
| 5,495,163 A | 2/1996 | Rozman et al. |
| 6,647,325 B2 * | 11/2003 | Shimazaki et al. ............. 701/22 |
| 6,747,834 B1 | 6/2004 | Matsuyama |
| 6,772,101 B1 | 8/2004 | Tanaka et al. |
| 6,826,499 B2 | 11/2004 | Colosky et al. |
| 2002/0024336 A1 | 2/2002 | Desbiolles et al. |

OTHER PUBLICATIONS

Initial Rotor Position Estimation method for PM Motors; Marco Tursini, Member IEEE Rroberto Petrella, Member IEEE, and Francisco Parasliti; IEEE Transactions on Industry Applications, vol. 39, No. 6, Nov./Dec. 2003.

(Continued)

*Primary Examiner* — Walter Benson
*Assistant Examiner* — David Luo

(57) ABSTRACT

The position of a rotor of a motor is determined. The motor includes a stator having a plurality of coils. The rotor includes at least one rotating magnetic field device. When the rotor is moving below a threshold speed, the current in the coils is measured. A pre-programmed data structure is accessed. The data structure stores stator currents associated with predetermined rotor positions. A first absolute position of the rotor is determined from the data structure according to the measured current from each of the coils. When the rotor is moving above the threshold speed, one or more rising or falling edges of magnetic field strength associated with the at least one rotating magnetic field device are sensed. At least one timing aspect of the rising and falling edges of magnetic field strength are compared to determine a second absolute position of the rotor.

36 Claims, 13 Drawing Sheets

OTHER PUBLICATIONS

New Initial Position Detection Technique for Three-Phase Business DC Motor Without Position and Current Sensors, Yen-Shin Lai Senior Member, IEEE, Fu-San Shyu, and Shian Shau Tseng, IEEE Transactions on Industry Applications, vol. 39, No. 2, Mar./Apr. 2003.

The Next Generation of Position Sensing parts I and II, Mar. 2001, Sensors; Asad M. Madni, Jim B. Vuong, and Roger F. Wells, BEI Technologies, Inc. http://archives.sensorsmag.com/articles.
Angular Position Sensing with 2-Axis Hall IC 2SA-10, AN-101 Sentron, Lou Law, Magnetic Sensors, Feb. 12, 2004, 7 pages.

* cited by examiner

Electrical Angle (degree)
Low resolution pulse width displaced by 2 high res counts (62 degrees and 257 degrees)

APPARATUS AND METHOD FOR DETERMINING ANGULAR POSITION

CROSS REFERENCES TO RELATED APPLICATIONS

This application is a continuation-in-part of prior U.S. patent application Ser. No. 12/061,635 filed Apr. 2, 2008 entitled "Systems and Methods for Monitoring Angular Position," naming Patrick O'Gorman, Rene Vivaco, and Alex Kurnia as inventors, the content of which is hereby incorporated herein by reference in its entirety.

FIELD OF THE INVENTION

The invention relates generally to the operation of motors and more specifically to the determination of rotor positions in motors.

BACKGROUND OF THE INVENTION

Vehicles typically have various control systems that operate and control the use of vehicular components. For example, one vehicular control unit controls the operation of the steering wheel. Steering wheel control units typically receive signals from users and sensors and utilize these signals to operate (e.g., turn) the steering wheel as the operator of the vehicle drives their vehicle.

The operation of the above-mentioned control units often depends upon or is directly or indirectly related to the angular position of the rotor of the motor. If this position cannot be determined accurately, then the control unit will not operate the vehicle component properly. In the case of a steering system controller, an inaccurate rotor position may cause the unit to be operated erratically resulting in steering problems for the vehicle and inadequate performance for the occupant of the vehicle.

Various approaches have been used to attempt to determine accurate rotor position such as using Hall sensors to measure the magnetic field transitions caused by a rotating magnetic ring associated with the rotor. However, to obtain accurate readings of the rotor position, a relatively large number of these sensors were required. Since Hall sensors were expensive to install and maintain, their usage increased the cost of the system. Further, the algorithms that are used to determine the rotor position were typically complicated and some times not very accurate. Consequently, the cost, complexity, and/or unreliability of previous approaches has led to general user dissatisfaction with these previous approaches.

BRIEF DESCRIPTION OF THE DRAWINGS

The present invention is illustrated, by way of example and not limitation, in the accompanying figures, in which like reference numerals indicate similar elements, and in which.

Figure 1:
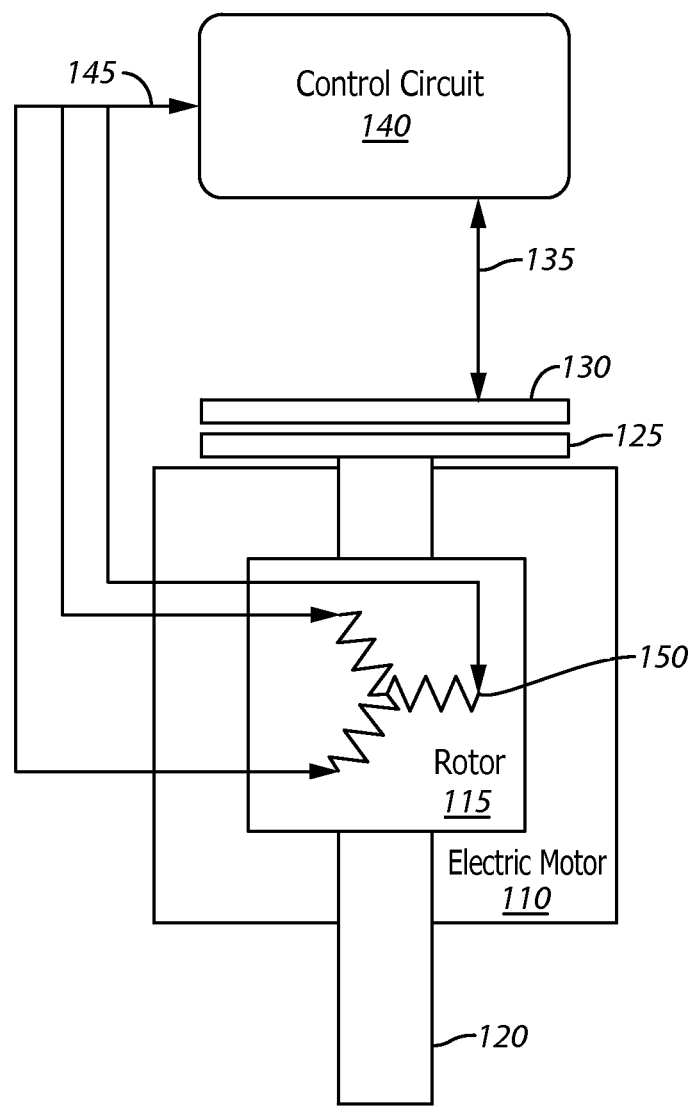
FIG. 1 is a block diagram of a system for determining the angular position of a rotor according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

An apparatus and method are provided that provide for the accurate determination of rotor position whether the rotor is moving or stationary using a minimum of magnetic and/or other sensors. These approaches are accurate and cost effective in determining rotor position and are substantially less expensive to implement than previous approaches. Consequently, user satisfaction with these approaches is increased compared to previous systems and vehicular systems (to name one example) can be operated properly.

In some aspects, the angular position of the rotor of an electric motor is to be determined so that a vehicular control unit can be operated. For instance, the angular position (and optionally the desired direction of rotation) may be determined in order for the appropriate current (amplitude and phase, for example) to be supplied to the electric motor or to operate the vehicular control unit (e.g., a steering control unit).

In some aspects, various sensors are used together with transition or magnetic rings to determine rotor position. For example, a digital sensor may be used and the digital sensor may include one or more detectors and one or more transition rings (having patterns corresponding to high and low signals) to be detected by the detector. The detector and transition ring may be mounted such that they rotate relative to each other as the motor rotates. For example, the transition ring may be mounted such that the pattern rotates in-sync with the rotor and the detector may be mounted stationary or vice versa. The digital sensor may be any suitable device that can generate a series of low and high signals while the transition ring rotates in relation to the detector. For example, the digital sensor may be a laser that is either reflected or not by the transition ring; a Hall sensor rotating over north and south magnets, or a reluctance sensor. Other examples of sensors are possible.

In other aspects, the electric motor may also comprise one or more high-resolution digital sensors that use a higher resolution transition rings. In one embodiment, two high resolution digital sensors having a period of 60 degrees may be used, the two high resolution digital sensors may be in quadrature with each other. The signals from the high resolution digital sensors may be combined with the low resolution signal to determine the direction in which the rotor is moving.

In some aspects, the electric motor may be calibrated such that a specific transition of the digital sensor is known to a high degree of accuracy. In such embodiments, once the calibrated transition occurs, the angular position of the rotor may be determined to a great degree of accuracy once that particular transition is detected.

In some of these embodiments, the position of a rotor of a motor is determined. The motor includes the rotor and a stator and the stator includes a plurality of coils. The rotor further includes at least one rotating magnetic field device such as a ring.

When the rotor is moving at or below a predetermined speed (e.g., is moving at an approximately zero speed) the current in each of the plurality of coils of the stator is measured. A pre-programmed data structure is accessed. The pre-programmed data structure stores a plurality of stator current values associated with a plurality of predetermined rotor positions. A first absolute position of the rotor is determined from the data structure according to the measured current from each of the plurality of coils.

When the rotor is moving (e.g., above a speed of zero such that it is moving), one or more rising or falling edges of magnetic field strength associated with the at least one rotating magnetic field device (e.g., ring) of the rotor are sensed. Timing aspects of the rising and falling edges of magnetic field strength for the sensors are compared to determine a second absolute position of the rotor. More specifically, the transition edge of one sensor may be compared to the states of other sensors to determine the second absolute position.

In some aspects, the magnetic field device includes a first and second magnetic ring. The one or more falling or rising edges are sensed using a first sensor to sense first rising and falling edges of a first rotating ring and using a second sensor to sense second rising and falling edges of the second rotating magnetic ring.

As mentioned, the sensors can be a wide variety of sensors. In one example, the first sensor comprises a Hall sensor. In another example, the second sensor includes two digital sensors in quadrature with each other.

In yet other aspects, an accuracy of an additional sensor (beyond the above-mentioned first and second sensors) can be determined and calibrated by comparing a position as indicated by the additional sensor to the determined rotor position. For example, a more expensive (and more accurate) sensor can be used within a vehicle (and the above-mentioned first and second sensors) and provide a rotor position. Then, according to the approaches described herein can be used to determine a rotor position. The two positions can be compared and it can be determined whether the position determined by the more expensive sensor is truly accurate.

In still other aspects, the data structure is populated prior to accessing the data structure. The data structure may be populated, in one example and at a variety of known rotor positions, by sending a plurality of voltage pulses into the coils of the stator, measuring the resultant currents, and recording the resultant currents in the data structure.

Various data structures may be used. In one example, the data structure is a look-up table. In other examples, the data structure is a linked list. Other examples of data structures are possible, including a mathematical formula relating resultant currents to rotor position.

In still other aspects, the first absolute rotor position and the second absolute rotor position are transmitted to a vehicular electronic control unit, and a vehicular control function is executed from the vehicular electronic control unit using the first absolute rotor position and the second absolute rotor position. Various control functions can be executed by the control unit. In one example, a steering function is executed. In other aspects, an engine control function, a transmission control function, a hybrid motor control function, or an auxiliary motor control function can be executed. Other examples are possible.

It will be appreciated that each of the two approaches described above (i.e., one determining rotor position when the rotor is moving below a speed or is stationary and the other when it is moving above a speed or is moving), can be used individually without necessarily using the other. In other words, each approach does not depend upon the other although they can be advantageously used together.

In some of these embodiments, a motor includes a rotor and a stator. The stator includes a plurality of coils and at least one rotating magnetic field device such as a ring. The system includes a vehicular control unit, one or more current sensors, one or more magnetic field sensors, and a rotor position determination unit or processing module.

The vehicular control unit is configured to control at least one vehicular function. The current sensor is configured to detect current in the plurality of coils of the stator. The magnetic field sensor is disposed about the at least one rotating magnetic field device.

The rotor position determination unit is coupled to the vehicular control unit, the at least one current sensor, and the at least one magnetic field sensor. The rotor position determination unit includes an interface, a memory, and a controller.

The interface has an input and an output. The input is configured to receive stator current values from the at least one current sensor. The stator current values are indicative of the current in the stator. The interface is further configured to receive one or more rising or falling edges of magnetic field strength associated with the at least one rotating magnetic field device (e.g., the ring) of the rotor at the input from the at least one magnetic field sensor.

The memory includes a pre-programmed data structure. The pre-programmed data structure stores a plurality of stator currents associated with a plurality of predetermined rotor positions.

The controller is coupled to the interface and the memory. The controller is configured to, when the rotor is not moving, receive the measured currents from the at least one current sensor at the input of the interface, access the pre-programmed information on data structure stored in the memory, determine a first absolute position of the rotor from the data structure according to the measured current from the at least one sensor, and transmit the first absolute position to the vehicular control unit via the output of the interface. The controller is further configured, when the rotor is moving to receive one or more rising or falling edges of magnetic field strength from the at least one magnetic field sensor at the input of the interface, compare at least one timing aspect of the rising and falling edges of magnetic field strength to determine a second absolute position of the rotor, and transmit the second absolute position to the vehicular control unit via the output of the interface.

The magnetic field sensor may be any combination of sensors. In one example, it includes at least one of a Hall sensor and two sensors in quadrature with each other. The data structure may be any number of data structures. In one example, the data structure is a look-up table. Other examples of sensors and data structures are possible.

The vehicular control unit may implement a number of functions. In one example, it implements a steering control function. In other aspects, an engine control function, a transmission control function, a hybrid motor control function, or an auxiliary motor control function can be executed. Other examples of control functions are possible. Additionally, although the above-mentioned control functions relate to vehicles and vehicular use, it will be appreciated that the approaches described herein can be used with any machine, apparatus, or system that uses a rotor.

In still other embodiments, a vehicular operational component includes a vehicular operation module that is coupled to a rotor position determination apparatus. The vehicular operation module is configured to provide a vehicle function such as a steering control function or other control function. The two components may be disposed in a housing.

Additionally, a motor includes a rotor and a stator. The stator includes a plurality of coils and at least one rotating magnetic field device (e.g., ring). One or more current sensors may be deployed in the stator. The current sensor is configured to detect current in the plurality of coils of the stator.

The rotor position determination apparatus is coupled to one or more magnetic field sensors. The magnetic field sensor is disposed about the at least one rotating magnetic field device (e.g., ring). The sensors may be disposed in, on, or outside of the housing.

The rotor position determination apparatus includes an interface, a memory, and a controller. The interface has an input and an output. The input is configured to receive stator current values from the at least one current sensor. The stator current values are indicative of the current in the stator. The interface is further configured to receive one or more rising or falling edges of magnetic field strength associated with the at least one rotating magnetic field device (e.g., ring) of the rotor at the input from the at least one magnetic field sensor.

The memory includes a pre-programmed data structure. The pre-programmed data structure stores a plurality of stator currents associated with a plurality of predetermined rotor positions.

The controller is coupled to the interface and the memory. The controller is configured to, when the rotor is not moving, receive the measured currents from the at least one current sensor at the input of the interface, access the pre-programmed information on data structure stored in the memory, determine a first absolute position of the rotor from the data structure according to the measured current from the at least one sensor, and transmit the first absolute position to the vehicular operation module via the output of the interface. The controller is further configured, when the rotor is moving to receive one or more rising or falling edges of magnetic field strength from the at least one magnetic field sensor at the input of the interface, compare at least one timing aspect of the rising and falling edges of magnetic field strength to determine a second absolute position of the rotor, and transmit the second absolute position to the vehicular operation module via the output of the interface. Once transmitted to the vehicular operation module, they may be used for other purposes or functions such as controlling a vehicular function (e.g., steering, braking, or engine control to mention a few examples).

Referring now to FIG. 1, a system for detecting an angular position of an electric motor is described. In some aspects, electric motor 110 is configured to receive electrical power and to convert the electrical power to mechanical energy, which may be transferred to a load through shaft 120. The motor may be a three-phase electric motor and may include three stator coils 150 configured to receive AC current through electric lines 145. The changing magnetic field generated by stator coils 150 generates a torque on rotor 115 and axle 120. In some aspects, rotor 115 may include one or more pairs of north-south power magnets. In other embodiments, rotor 115 may include electromagnets that generate magnetic fields using coils and DC current. In some aspects, control circuit 140 is configured to generate appropriate currents to supply to stator coils 150 through electrical lines 145. Other types of motors can also be used such as a dc motor or an induction motor. Depending on the rotational speed, direction of the rotational speed, and position of the rotor, currents having an appropriate amplitude and phase must be supplied to the stator coils to generate optimal rotation of the rotor.

Electric motor 110 may also include one or more digital sensors that are coupled to control circuit 140 using electrical line 135. In some embodiments, the digital sensors may include detectors 130 that may be stationary and transition rings 125 containing high and low signal information that may be detected by detectors 130 while transition rings 125 rotate relative to detectors 130.

The digital sensor may be any suitable device that can generate a series of low and high signals while the transition ring rotates in relation to the detector. For example, the digital sensor may be a laser that is either reflected or not by the transition ring; a Hall sensor rotating over north and south magnets, or a reluctance sensor. Other examples of sensors are possible.

Figure 2:
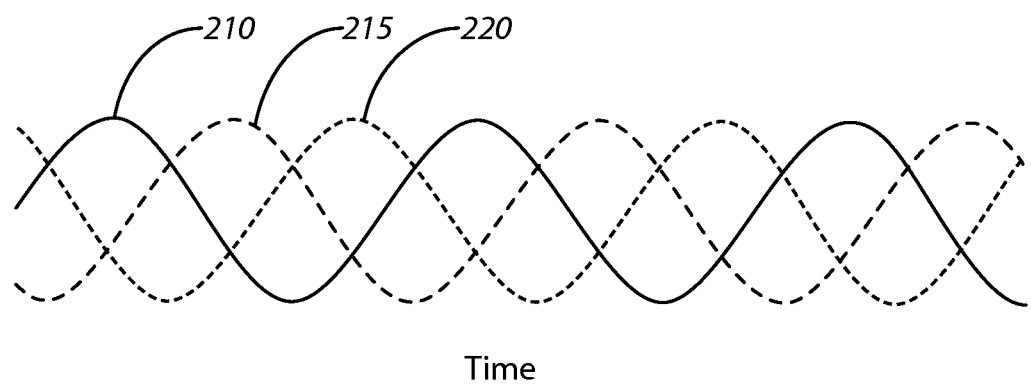
FIG. 2 is a graphical representation showing signals returned from the stator used in determining rotor position according to various embodiments of the present invention.

Referring now to FIG. 2, a graphical representation illustrating example signals returned from the stator coils of an electric motor indicating a position of the electric motor is described. An initial angular position of the electric motor may be determined by sending electrical pulses to stator coils 150 using control circuit 140 (shown in FIG. 1). Shown in this figure are the times the electric pulses return to control circuit 140 for different positions of rotor 115. Graphs 210, 215, and 220 correspond to each of stator coils 150. The timing of the returning pulses from each of the stator coils depends on the angular position of the rotor. In some aspects, a single pulse from a single stator coil may be used to determine an initial position of the rotor. In other aspects, for increased accuracy, additional pulses may be sent through the single stator coil and then averaged. For additional accuracy pulses may be sent through one or more additional stator coils (or more multiple averaged pulses).

Figure 3:
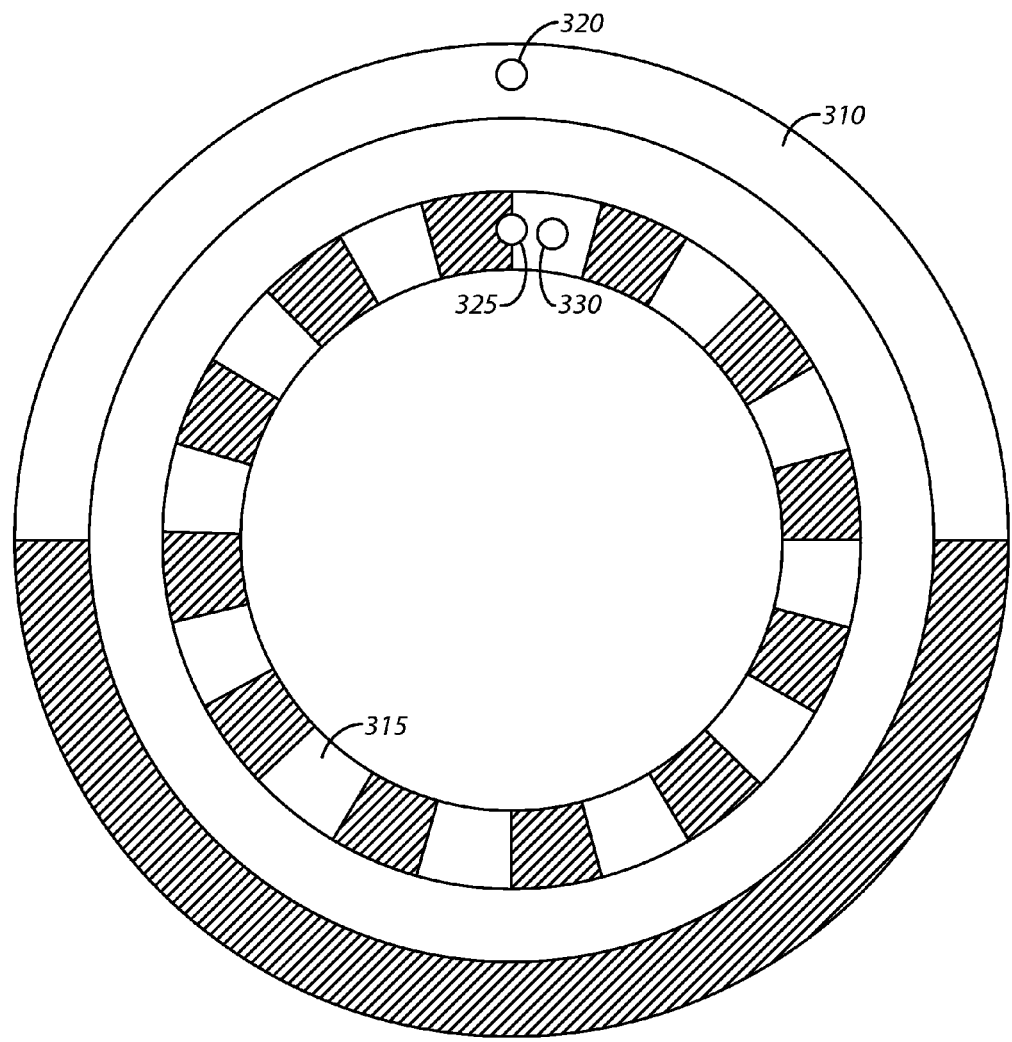
FIG. 3 is a block diagram showing digital sensors according to various embodiments of the present invention.

Referring now to FIG. 3, is a system of sensors used in the determination of the angular position of an electric motor is described. A low resolution digital monitor may include detector 320 and transitions ring 310. In some embodiments, detector 320 may be mounted such that detector 320 rotates relative to transitions ring 320 when the electric motor rotates. For example, transition ring 310 may be connected to the rotor of the electric motor, and detector 320 may be mounted to a stationary portion of the electric motor or vice versa.

Any suitable digital sensor may be used that can generate low and high type signals. In some embodiments, a hall sensor may be used as the detector and magnets may be used for the transition rings. A south magnet, for example, may indicate a low value (hashed portion of the ring) and a north magnet may be used to indicate a high value. Other similar digital sensors may be used such a laser light as the detector and reflective/non-reflective surfaces as the transition ring. A reluctance type sensor may also be used.

One or two or more high resolution digital sensors may also be used. In some embodiments, detector 325 and 330 may be used in combination with transitions ring 315. The hashed surfaces may indicate the high values of the signal, for example. In some embodiments, the two high-resolution sensors may be in quadrature with each other—90 degrees out-of-phase with each other.

Figure 4:
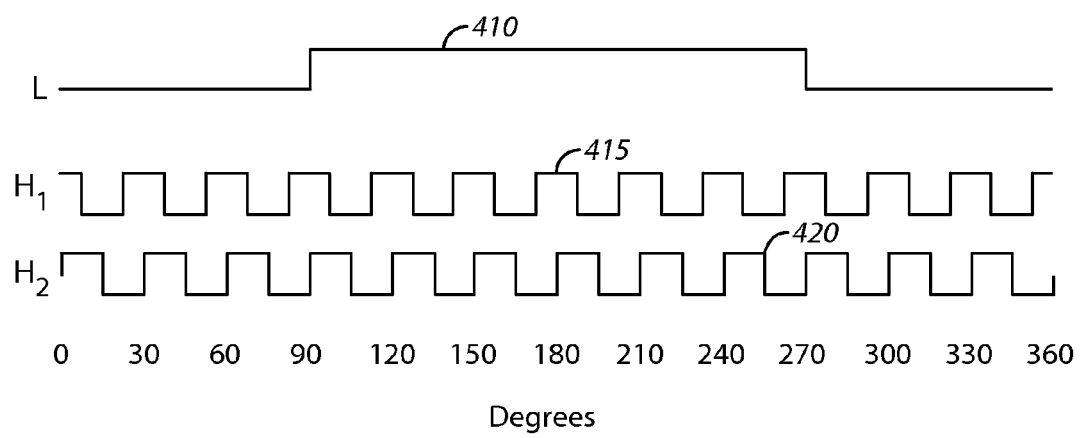
FIG. 4 is a graph illustrating signals received from digital sensors used in determining angular position of a rotor according to various embodiments of the present invention.

Referring now to FIG. 4, example signals generated by the digital sensors are described. Additional low resolution sensors may be used (not shown here) for increased accuracy and reliability.

FIG. 4 is a graphical representation illustrating signals received from digital sensors used in the determination of the angular position of an electric motor. As shown in the figure, signal 410 (L) may be generated from detector 320 and transition ring 310, signal 415 (L.sub.1) may be generated from detector 330 and transition ring 315, and signal 420 (L.sub.2) may be generated using detector 325 and again transition ring 315.

An angular position of the electric motor may be determined when a transition in signal 410 occurs. The transitions may be calibrated to correspond to known angular positions. A transition may be identified by examining high resolution signals 415 and 420. For example, if a rising transition is detected in signal 410 and a rising transition is detected in signal 420, the transition corresponds to the angular position at 90 degrees. If on the other hand a falling transition is detected on signal 420, the transition corresponds to the angular position at 270 degrees.

Similarly, the direction of rotation may be determined. In the example above, the first scenario would correspond to a clockwise rotation and the second scenario would correspond to counter-clockwise rotation.

Figure 5:
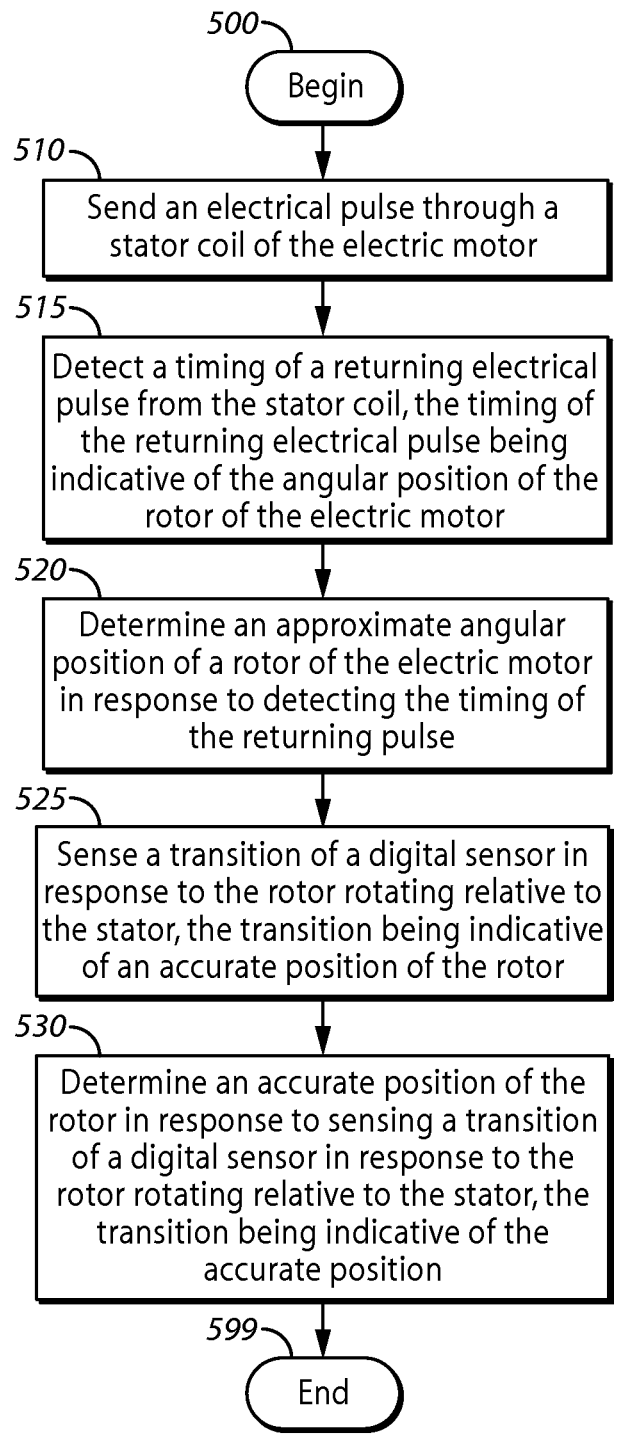
FIG. 5 is a flow diagram of one approach for determining the angular position of a rotor according to various embodiments of the present invention.

Referring now to FIG. 5, a flow diagram illustrating a method for detecting the angular position of an electric motor is described. Processing begins at step 500 whereupon, at block 510, an electrical pulse is sent through a stator coil of the electric motor.

At step 515, a timing of a returning electrical pulse from the stator coil is detected, the amplitude of the returning electrical pulse being indicative of the angular position of the rotor of the electric motor.

At step 520, an approximate angular position of a rotor of the electric motor is determined in response to detecting the timing of the returning pulse.

At step 525, a transition of a digital sensor is sensed in response to the rotor rotating relative to the stator, the transition being indicative of an accurate position of the rotor.

At step 530, an accurate position of the rotor is determined in response to sensing a transition of a digital sensor in response to the rotor rotating relative to the stator, the transition being indicative of the accurate position of the rotor. Processing subsequently ends at step 599. It will be appreciated that FIG. 1 shows an example of a system that may be used to perform the method described here with respect to FIG. 5.

Figure 6:
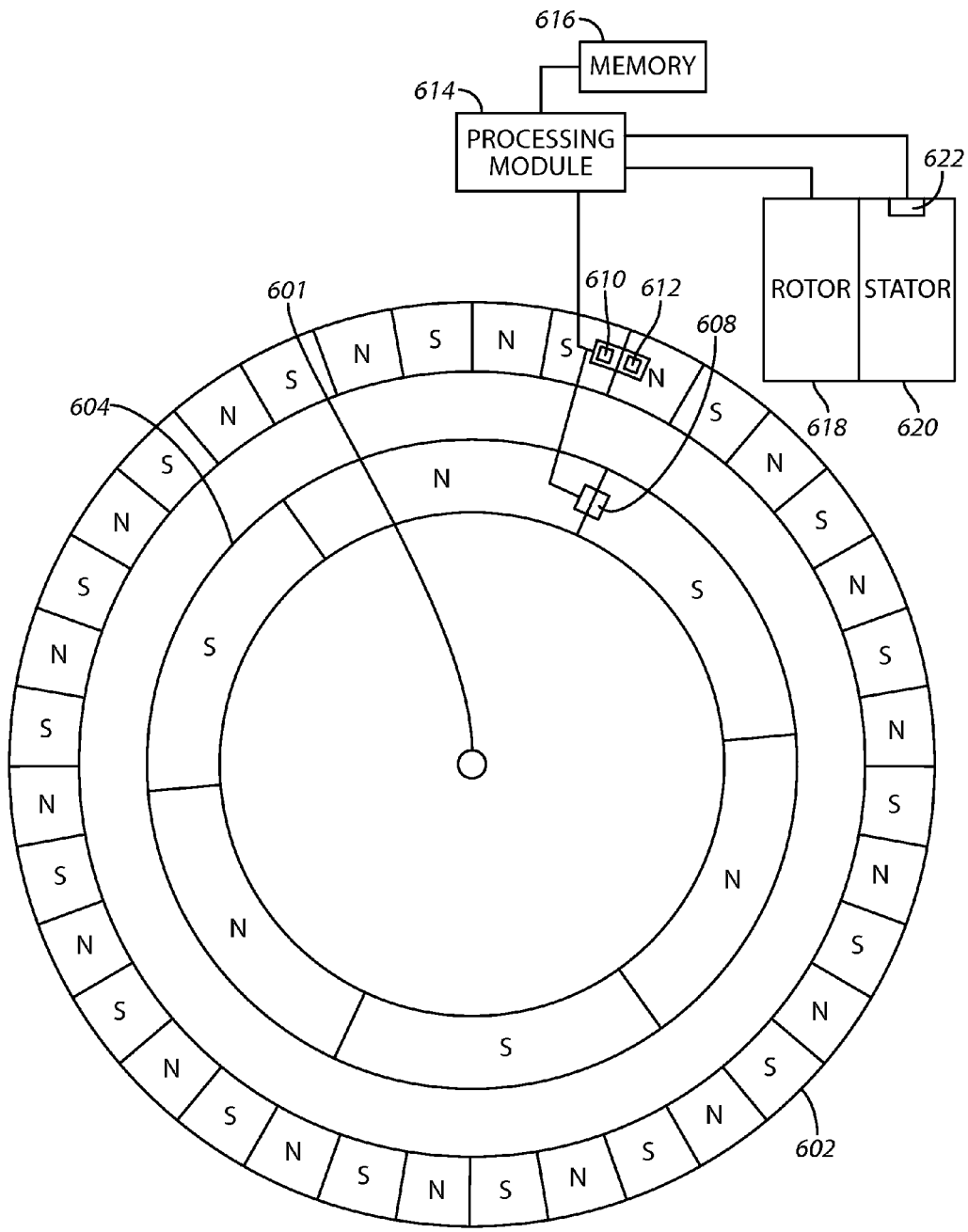
FIG. 6 is a is a block diagram of a system for determining rotor position according to various embodiments of the present invention.

Referring now to FIG. 6, one example of a system for determining the angular position of a rotor 618 is described. The system includes a first magnetic ring 602 and a second magnetic ring 604. Both rotate about an axis 601. A first sensor 610 and a second sensor 612 measures magnetic flex as the first ring 602 rotates. A third sensor 608 measures the magnetic flux as the second ring 604 rotates. When the electric motor and the rotor 618 rotate, the rings 602 and 604 rotate. In one example, the sensors 608, 610 and 612 are fixed in position at, above, or around the rings.

The sensor 608 may be a Hall sensor and the sensors 610 and 612 may be digital quadrature sensors in one example. Other examples of sensors are possible. The sensors 608, 610, and 612 are coupled to a processing module 614 and the processing module 614 is coupled to a memory 616. In some aspects and when the rotor is moving (or is moving above a predetermined speed), the processing module 614 uses the sensed readings from the sensors 608, 610, and 612 to determine a position of the rotor 618 that rotates about an associated stator 620. In other aspects when the rotor 618 is not moving (or is moving below a predetermined speed), the processing module 614 measures current in the stator 620 and uses a data structure in the memory 616 to determine a rotor position. It will be understood that the rotor 618 and the stator 620 are connected to the same axis 601 as shown in the example of FIG. 1, but have been illustrated here as not being fixed to the axis 601 for purposes of clarity.

In one example of the operation of the system of FIG. 6, the processing module 614 determines if the rotor 618 is moving (or is moving above or below a predetermined speed). For example, this may be accomplished by analyzing readings from any of the sensors (e.g., the Hall sensor) to see if it has above or below a certain number of transitions within a predetermined amount of time. As mentioned, when the rotor is not moving (or is moving below a predetermined speed) the current in each of the plurality of coils of the stator is measured by current sensors 622 that are disposed at the coils of the stator 620. Then, a pre-programmed data structure is accessed from the memory 616 and this pre-programmed data structure stores a plurality of stator currents associated with a plurality of predetermined rotor positions. A first absolute position of the rotor is determined from accessing the data structure according to the measured current from each of the plurality of coils of the stator 620.

The data structure is created by transmitting voltage pulses into the coils of the stator 620 at known positions of the rotor 618. The data structure may be any type of data structure that is suitable for recording these readings such as a look-up table, linked list, and so forth. Other examples of data structures may also be used. The resultant currents are then measured and recorded in the data structure. Consequently, after the data structure is created and populated, the current in each of the coils (e.g., three coils) can be measured, the table accessed (based upon and using the measured current as an index) and the angular position of the rotor 618 determined.

On the other hand, when the rotor 618 is moving (or moving above a predetermined speed), one or more rising or falling edges of magnetic field strength associated with the rotating magnetic ring 604 and/or rotating ring 602 of the rotor 614 are sensed. At least one timing aspect of the rising and/or falling edges of magnetic field strength are compared to determine a second absolute position of the rotor. For example, the rising/falling edge determined by the Hall sensor 608 may locate the rotor position to +/−180 degrees while the information determined by the sensors 610 and 612 may narrow this down to a range of +/−20 degrees.

Thus, the approaches used herein eliminate the need for multiple Hall sensors while at the same time allowing the rotor position to be determined to a high degree of sensitivity. As a result, system costs are reduced since fewer sensors are required. Maintainability and operability are also improved.

Figure 7:
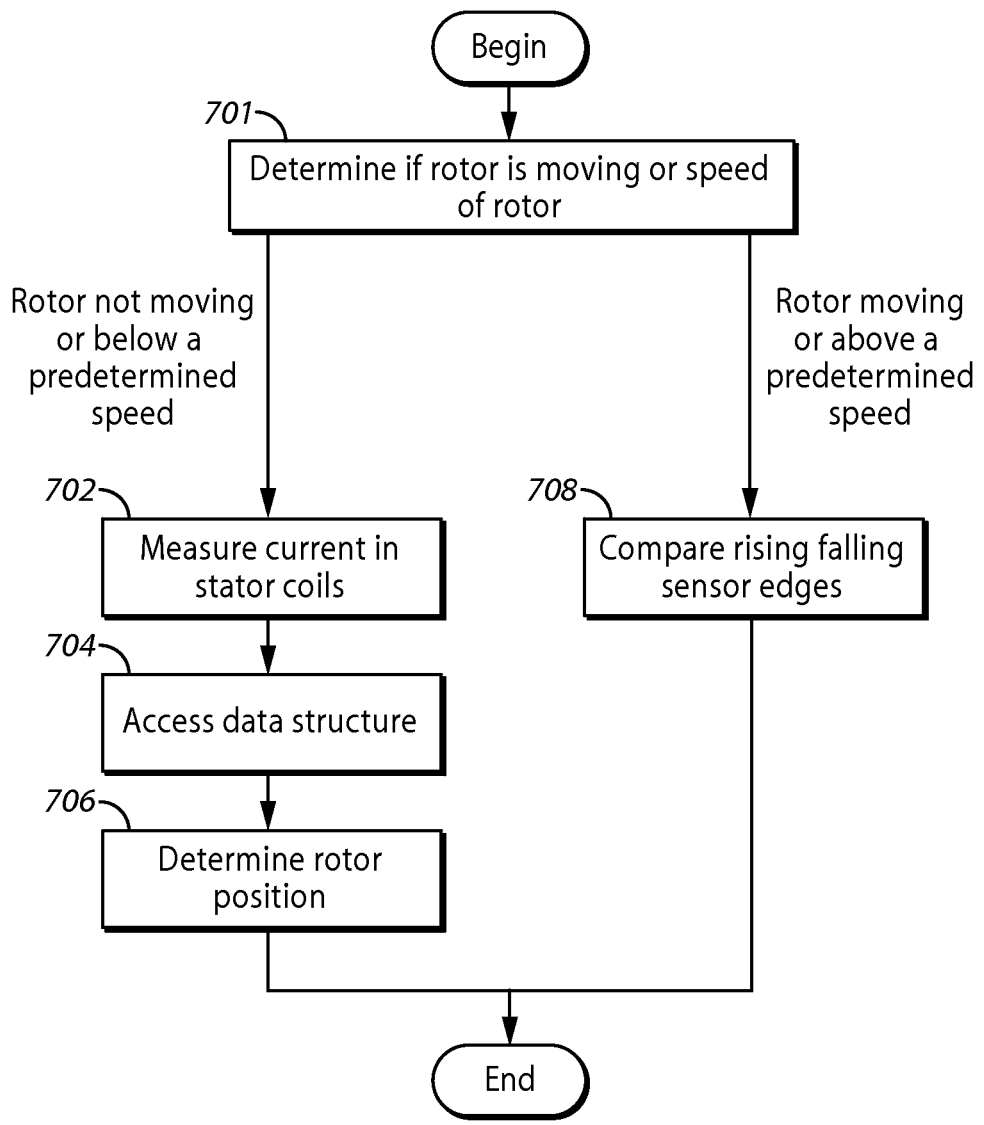
FIG. 7 is a is a flow chart of an approach for determining rotor position according to various embodiments of the present invention.

Referring now to FIG. 7, one example of an approach for determining the position of a rotor is described, for example using the system of FIG. 6. The motor includes a rotor and a stator and the stator including a plurality of coils. The rotor further includes at least one rotating magnetic ring (e.g., the rings 602 and 604 of FIG. 6).

At step 701, it is determined if the rotor is moving (and/or the speed is determined). For example, this may be accomplished by looking at readings from any of the sensors (e.g., the Hall Sensor) to see if it has above or below a certain number of transitions within a predetermined amount of time. If the answer is negative, then execution continues at step 702 and if the answer is affirmative, execution continues at step 708.

At step 702, when the rotor is not moving (or moving below a predetermined speed), the current in each of the plurality of coils of the stator is measured. For example, various types of current sensors as know by those skilled in the art may be used to sense the current. At step 704, a pre-programmed data structure is accessed. As mentioned elsewhere herein, the pre-programmed data structure stores a plurality of stator currents associated with a plurality of predetermined rotor positions.

At step 706, a first absolute position of the rotor is determined from the data structure according to the measured current from each of the plurality of coils. The sensed current(s) may be used as an index to access the data structure and determine the corresponding rotor position. Interpolation approaches may also be used to determine a value for the rotor position for currents not found exactly in the data structure (i.e., the sensed value lies between two values in the data structure).

At step 708, when the rotor is moving (or is moving above a predetermined speed) one or more rising or falling edges of magnetic field strength associated with the at least one rotating magnetic ring of the rotor are sensed. At least one timing aspect of the rising and falling edges of magnetic field strength are compared to determine a second absolute position of the rotor. At least one timing aspect of the rising and/or falling edges of magnetic field strength may be compared to determine a second absolute position of the rotor. For example, the rising/falling edge determined by a Hall sensor may locate the rotor position to +/−180 degrees while the information determined by quadrature sensors may narrow this down to a range of +/−20 degrees.

Figure 8:
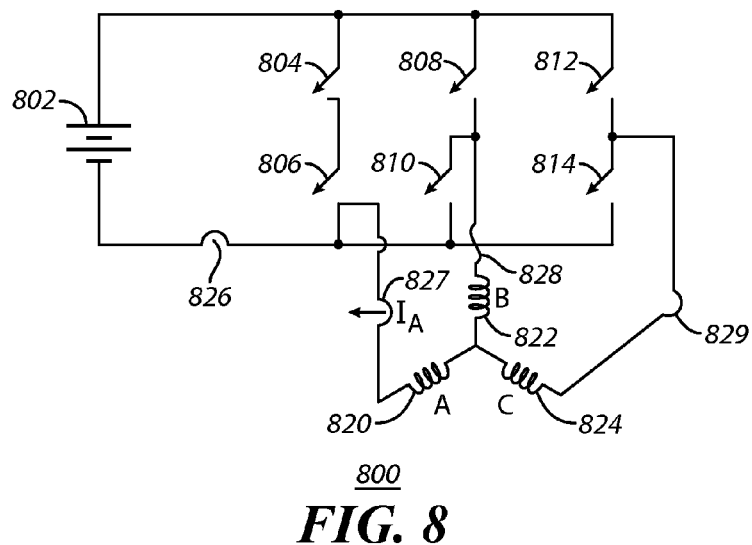
FIG. 8 is a circuit diagram of a current sensing circuit for sensing stator currents according to various embodiments of the present invention.

Referring now to FIG. 8, one example of a current sensing circuit is described. The circuit 800 includes a power supply 802, a first switch 804, a second switch 806, a third switch 808, a fourth switch 810, a fifth switch 812, and a sixth switch 814. The switches 804 and 806 couple to a first stator coil 820 (A). The switches 808 and 810 couple to a second stator coil 822 (B). The switches 812 and 814 couple to a third stator coil 824 (C). Current sensors 826, 827, 828, and 829 sense current that is produced in the coils 820, 822, and 824. By activating or deactivating the various switches, voltage is applied to the various coils 820, 822, and 824 of the stator and the resultant currents are measured by the sensors.

Figure 9:
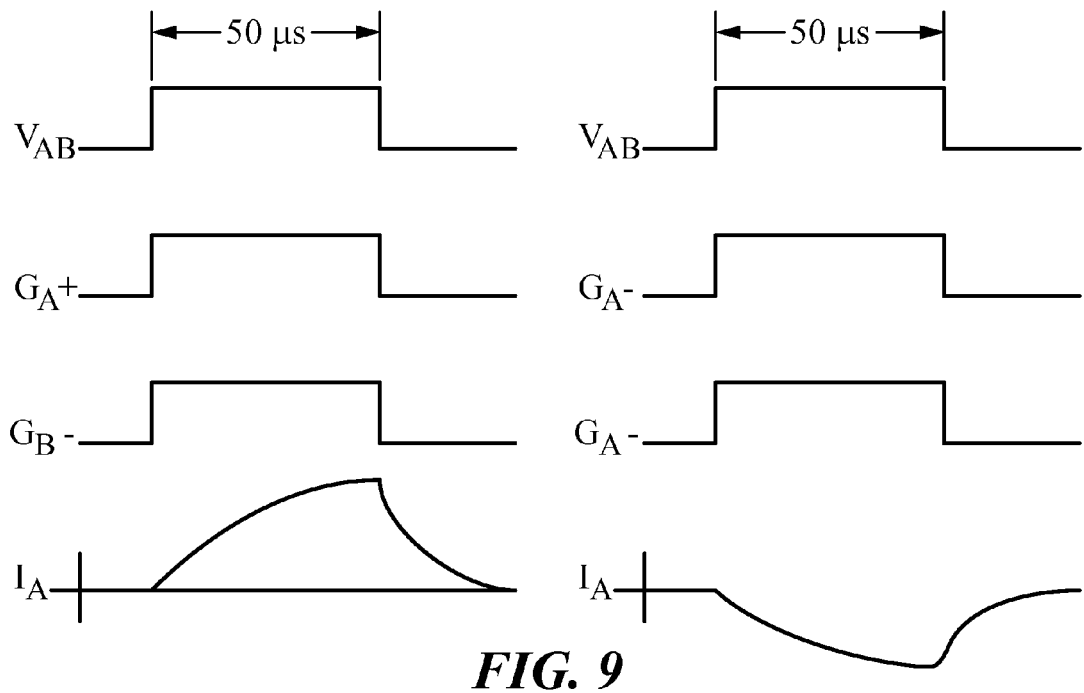
FIG. 9 is a waveform diagram showing stator currents according to various embodiments of the present invention.

Referring now to FIG. 9, one example of a waveform associated with the current sensing circuit is described. A 50 microsecond voltage pulse is created between the coils A and B. The switches 804 and 810 are closed (and the other switches opened) and the resultant currents are sensed. Then, with the other switches open, switches 806 and 808 are closed and the resultant currents measured.

Figures 10, 11:
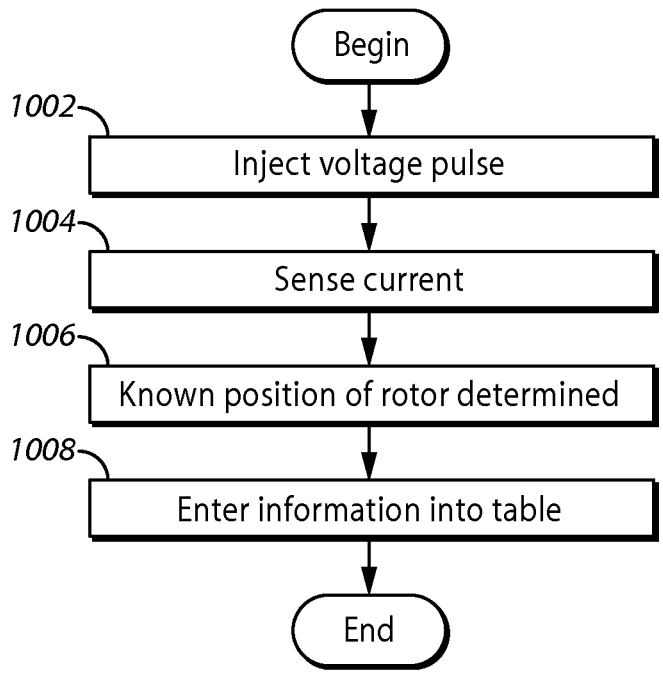
FIG. 10 is a flowchart showing one approach for creating a look-up table according to various embodiments of the present invention.
FIG. 11 is a block diagram of one example of a look-up table according to various embodiments of the present invention.

Referring now to FIG. 10, one example of an approach for creating the look-up table is described. At step 1002, a voltage pulse is injected into the stator or one winding of the stator. This may be accomplished, for example, by using a switching arrangement as shown in FIG. 8 to selectively apply voltages pulses to each of the stator coils.

At step 1004, the current is sensed both in the positive and negative directions, for example using one of the current sensors shown in FIG. 8. At step 1006, the known angular position is determined/set. This may be accomplished, for example, by viewing the location of the rotor. At step 1008, the current (or currents) are entered against this known angular position of the rotor.

Referring now to FIG. 11, one example of a look-up table is described. In this example, the difference between the current flowing in the positive direction versus the current flowing in the negative direction is computed and a rotor angle determined or observed. For current values $\Delta IA1$, $\Delta IB1$, $\Delta IC1$, the rotor's position is R1. For current values $\Delta IA2$, $\Delta IB2$, $\Delta IC2$, the rotor's position is R2. The computation of these values is described below with respect to FIG. 12. An observer can record the values of rotor position R1 and R2.

Figure 12:
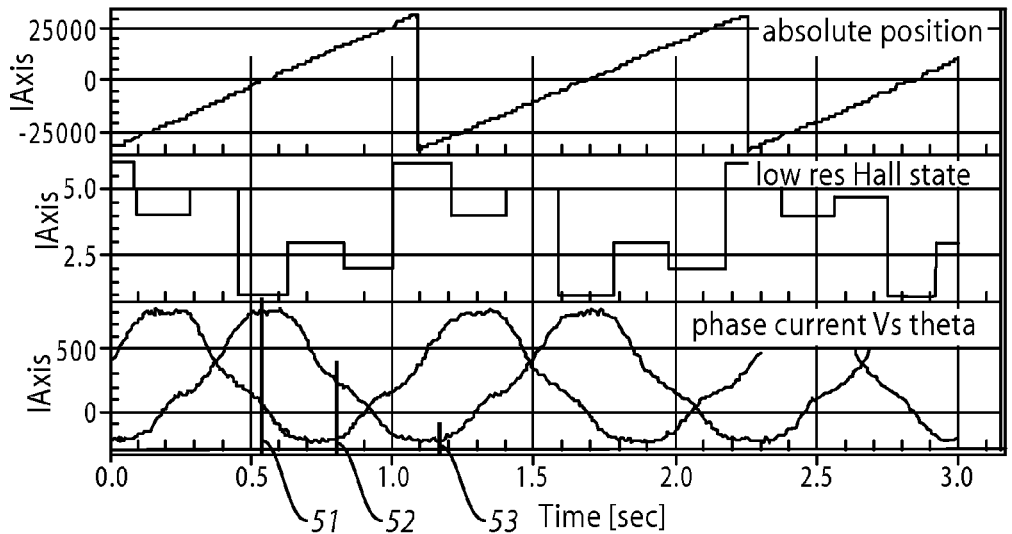
FIG. 12 is a diagram showing sensing waveforms according to various embodiments of the present invention.

Referring now to FIG. 12, one example of sensing waveforms from the sensors is described. The graph shows phase current differences in positive and negative stator currents as a function of absolute rotor position. This graph also illustrates how the table is created. In this example, relative values are used. For example, I+++ indicates a current much greater than current I+. Absolute values are also used in this example for illustration purposes.

At time S1 and for coil A, V+ produces a current of I+++, while V− produces a current of I−. $\Delta I=|I+++|-|I-|$ which may be +2 in one example. At time S2, V+ produces a current of I++, while V− produces a current of I−−. $\Delta I=|I++|-|I--|$ which may be 0 in one example. At time S3, V+ produces a current of I+, while V− produces a current of I−−−. $\Delta I=|I+|-|I---|$ which may be −2 in one example. To continue the example, at time S1, $\Delta IA$ is +2, $\Delta IB=-1.0$ and $\Delta IC=-1$ and this is associated with angle A1. At time S1.1, $\Delta IA$ is +2, $\Delta IB=-1.2$ and $\Delta IC=-0.8$ and this is associated with angle A2. In this way, a table can be created relating $\Delta I$ values with absolute rotor position. After the table is created, the values can be accessed as described elsewhere herein.

Figure 13:
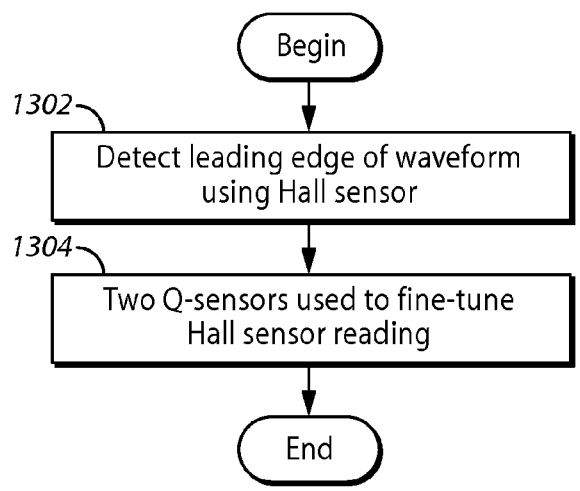
FIG. 13 is a flowchart of one approach for determining the position of a moving rotor according to various embodiments of the present invention.

Referring now to FIG. 13, one example of an approach for determining rotor position while the rotor is moving (or moving above a predetermined speed) is described. At step 1302 the leading edge as detected by the Hall sensor. If a single Hall sensor is used, the value is 0 degrees or 180 degrees. At step 1304, the two Q-sensors are used to fine-tune this range. For example, as discussed below with respect to FIG. 14, for a rising edge of a Hall sensor, Q1 and Q2 is one value or one set of values.

Figure 14:
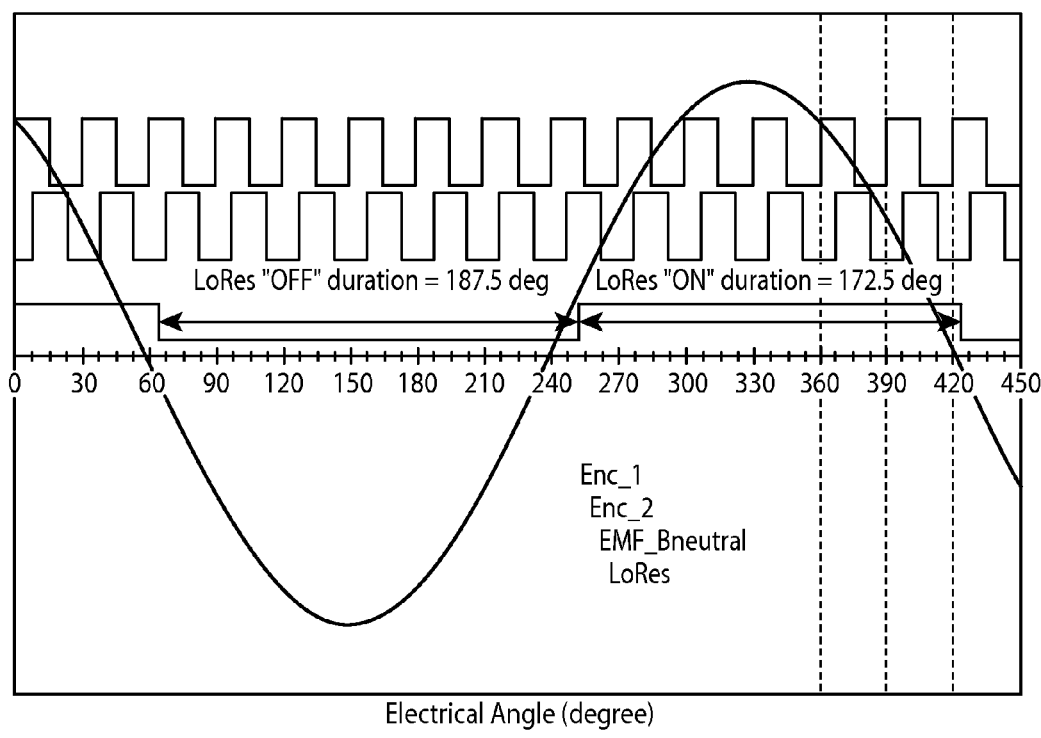
FIG. 14 is a waveform diagram of one approach for determining the position of a moving rotor according to various embodiments of the present invention.

Referring now to FIG. 14 if the rising edge of the Hall waveform indicates some value between approximately 240 and approximately 420 degrees, that is greater than 240 degrees and less than 60 degrees. However, checking the values of the two quadrature sensors will narrow this range. For example, if Q1 is 1 and Q2 is 0, then the angle may be narrowed to approximately 255 degrees.

Figure 15:
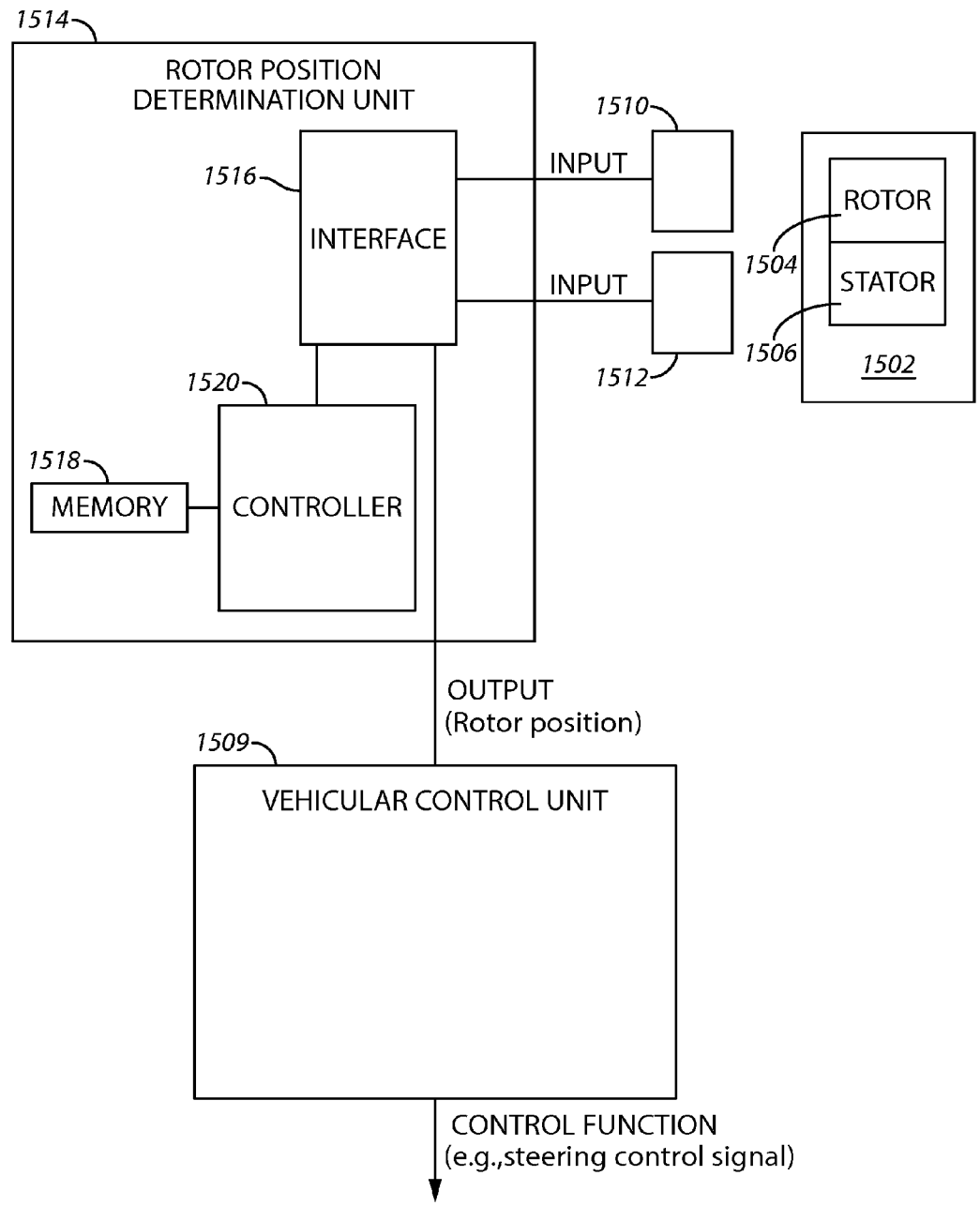
FIG. 15 is a block diagram of a system for determining rotor position according to various embodiments of the present invention.

Referring now to FIG. 15, one example of a system 1500 for determining a position of a rotor of a motor 1502. The motor 1502 includes a rotor 1504 and a stator 1506. The stator 1506 includes a plurality of coils and at least one rotating magnetic ring. The system 1500 includes a vehicular control unit 1508, one or more current sensors 1510, one or more magnetic field sensors 1512, and a rotor position determination unit or processing module 1514.

The vehicular control unit 1508 is configured to control at least one vehicular function. The current sensor 1510 is configured to detect current in the plurality of coils of the stator. The magnetic field sensor 1512 is disposed about the at least one rotating magnetic rings.

The rotor position determination unit 1514 is coupled to the vehicular control unit 1508, the at least one current sensor 1510, and the at least one magnetic field sensor 1512. The rotor position determination unit 1514 includes an interface 1516, a memory 1518, and a controller 1520.

The interface 1516 has an input and an output. The input is configured to receive stator current values from the at least one current sensor. The stator current values are indicative of the current in the stator. The interface is further configured to receive one or more rising or falling edges of magnetic field strength associated with the at least one rotating magnetic ring of the rotor at the input from the at least one magnetic field sensor.

The memory 1518 includes a pre-programmed data structure. The pre-programmed data structure stores a plurality of stator currents associated with a plurality of predetermined rotor positions.

The controller 1520 is coupled to the interface 1516 and the memory 1518. The controller is configured to, when the rotor is not moving, receive the measured currents from the at least one current sensor at the input of the interface, access the pre-programmed data structure stored in the memory, determine a first absolute position of the rotor from the data structure according to the measured current from the at least one sensor, and transmit the first absolute position to the vehicular control unit via the output of the interface. The controller 1520 is further configured, when the rotor is moving to receive one or more rising or falling edges of magnetic field strength from the at least one magnetic field sensor at the input of the interface, compare at least one timing aspect of the rising and falling edges of magnetic field strength to determine a second absolute position of the rotor, and transmit the second absolute position to the vehicular control unit via the output of the interface 1516.

The magnetic field sensor may be any combination of sensors. In one example, it includes at least one of a Hall sensor and two sensors in quadrature with each other. The data structure may be any number of data structures. In one example, the data structure is a look-up table. Other examples of sensors and data structures are possible.

The vehicular control unit may implement a number of functions. In one example, it implements a steering control function. In other aspects, an engine control function, a transmission control function, a hybrid motor control function, or an auxiliary motor control function can be executed. Other examples of functions are possible.

Figure 16:
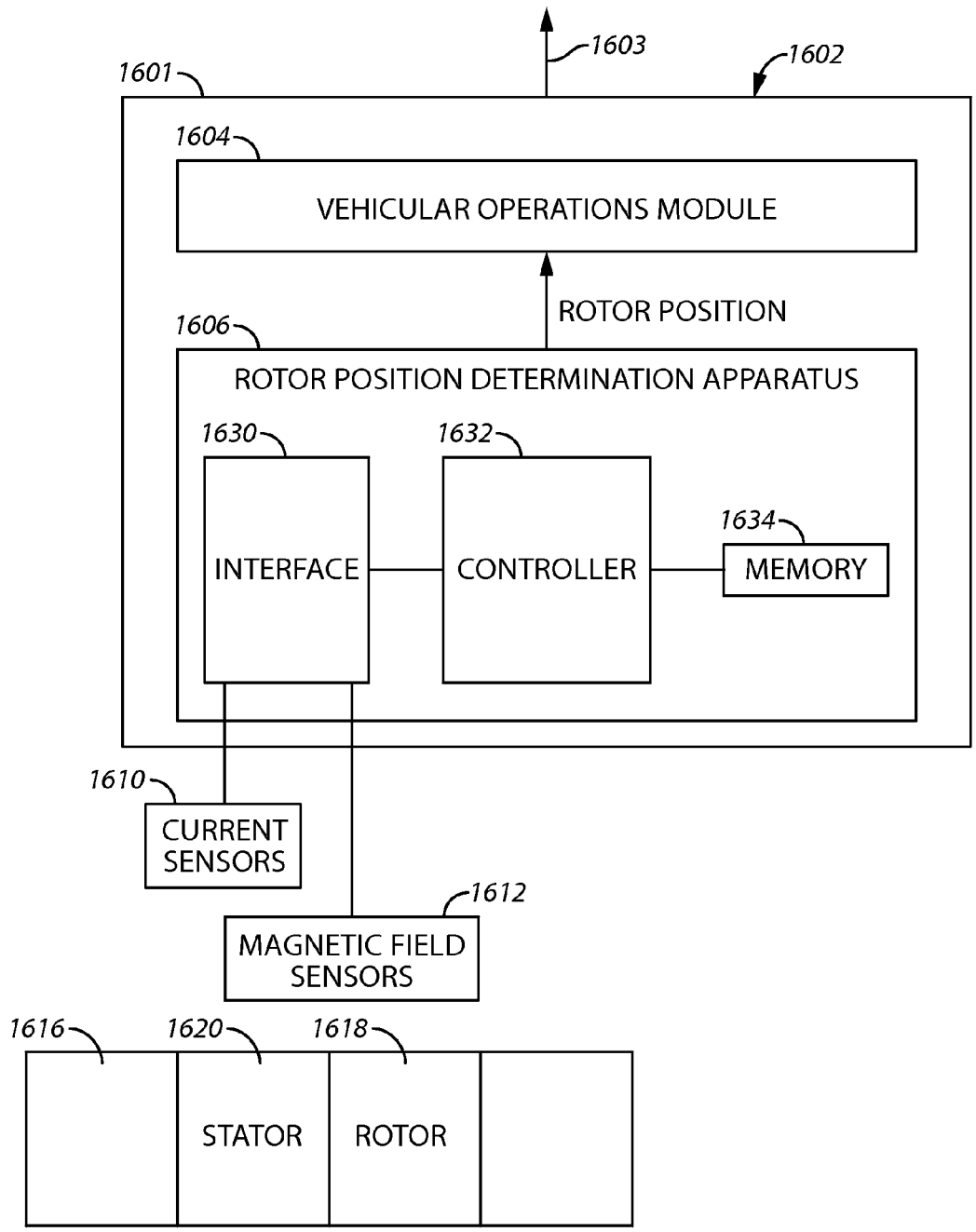
FIG. 16 is a block diagram of a system for determining rotor position according to various embodiments of the present invention.

Referring now to FIG. 16, a vehicular operational component 1602 (disposed at or within a vehicle) includes a vehicular operation module 1604 and a rotor position determination apparatus 1606 disposed in a housing 1601. The operation module 1604 is configured to provide a vehicle function (e.g., a control function such as a steering control function) via control lines 1603 which are coupled to other vehicle components. The rotor position determination apparatus 1606 may be coupled to one or more current sensors 1610, and one or more magnetic field sensors 1612 which may be in, on, or outside of the housing 1601. In this example, the sensors are shown as being outside the housing 1601. Appropriate wiring extends through the housing to couple the components together.

A motor 1616 includes a rotor 1618 and a stator 1620. The stator 1620 includes a plurality of coils and at least one rotating magnetic ring. The sensors 1610, 1612 are disposed about these components.

As mentioned, the vehicular operation module 1604 is configured to control at least one vehicular function via the control lines 1603. The current sensor 1610 is configured to detect current in the plurality of coils of the stator. The magnetic field sensor 1612 is disposed about the at least one rotating magnetic rings.

The rotor position determination apparatus 1606 includes an interface 1630, a memory 1632, and a controller 1634. The interface 1630 has an input and an output. The input is configured to receive stator current values from the at least one current sensor 1610. The stator current values are indicative of the current in the stator 1620. The interface 1630 is further configured to receive one or more rising or falling edges of magnetic field strength associated with the at least one rotating magnetic ring of the rotor 1618 at the input from the at least one magnetic field sensor 1612.

The memory 1632 includes a pre-programmed data structure. The pre-programmed data structure stores a plurality of stator currents associated with a plurality of predetermined rotor positions.

The controller 1634 is coupled to the interface 1630 and the memory 1632. The controller 1634 is configured to, when the rotor 1618 is not moving (or moving below a predetermined speed, the speed measured in any units), receive the measured currents from the at least one current sensor at the input of the interface 1630, access the pre-programmed information on data structure stored in the memory 1632, determine a first absolute position of the rotor 1618 from the data structure according to the measured current from the at least one sensor, and transmit the first absolute position to the vehicular operation module 1604 via the output of the interface 1630. The controller 1634 is further configured, when the rotor is moving (or moving above a predetermined speed, the speed measured in any units) to receive one or more rising or falling edges of magnetic field strength from the at least one magnetic field sensor at the input of the interface 1630, compare at least one timing aspect of the rising and falling edges of magnetic field strength to determine a second absolute position of the rotor, and transmit the second absolute position to the vehicular operation module 1604 via the output of the interface 1630. The vehicular operation module 1604 then utilizes the determined rotor position to implement a vehicle function.

It is understood that the implementation of other variations and modifications of the present invention and its various aspects will be apparent to those of ordinary skill in the art and that the present invention is not limited by the specific embodiments described. It is therefore contemplated to cover by the present invention any modifications, variations or equivalents that fall within the spirit and scope of the basic underlying principles disclosed and claimed herein.

What is claimed is:

1. A method for determining a position of a rotor of a motor, the motor including the rotor and a stator, the stator including a plurality of coils, the rotor further including at least one rotating magnetic field device, the method comprising:
when the rotor moving below a threshold speed:
measuring the current in each of the plurality of coils of the stator;
accessing a pre-programmed data structure, the pre-programmed data structure storing a plurality of stator currents associated with a plurality of predetermined rotor positions;
determining a first absolute position of the rotor from the data structure according to the measured current from each of the plurality of coils;
when the rotor is moving above the threshold speed:
sensing one or more rising or falling edges of magnetic field strength associated with the at least one rotating magnetic field device of the rotor;
comparing at least one timing aspect of the rising and falling edges of magnetic field strength to determine a second absolute position of the rotor.

2. The method of claim 1 wherein the at least one rotating magnetic field device is selected from the group consisting of at least one of: a rotating magnetic ring; at least one magnet, and at least one magnetic coil.

3. The method of claim 1 wherein the threshold speed is approximately zero.

4. The method of claim 1 wherein the magnetic field device comprises a first and second magnetic ring and wherein sensing one or more falling or rising edges comprises using a first sensor to sense first rising and falling edges of a first rotating ring and using a second sensor to sense second rising and falling edges of the second rotating magnetic ring.

5. The method of claim 4 wherein the first sensor comprises a Hall sensor.

6. The method of claim 4 wherein the second sensor comprises two sensors in quadrature with each other.

7. The method of claim 4 further comprising calibrating an accuracy of an additional sensor by comparing a position as indicated by the additional sensor to the determined rotor position.

8. The method of claim 1 further comprising populating the data structure prior to accessing the data structure.

9. The method of claim 8 wherein populating the data structure comprises, at a known rotor position, sending a plurality of voltage pulses into the coils of the stator, measuring the resultant currents or representation of the current, recording the resultant currents or representation of the current in the data structure.

10. The method of claim 1 wherein the data structure comprises a look-up table.

11. The method of claim 1 further comprising, transmitting the first absolute rotor position and the second absolute rotor position to a vehicular electronic control unit, and executing a vehicular control function from the vehicular electronic control unit using the first absolute rotor position and the second absolute rotor position.

12. The method of claim 11 wherein executing a vehicular control function comprises executing a control function selected from the group consisting of: a steering function, an engine control function, a transmission control function, a hybrid motor control function, and an auxiliary motor control function.

13. An apparatus for determining a position of a rotor of a motor, the motor including the rotor and a stator, the stator including a plurality of coils, the rotor further including at least one rotating magnetic field device, the apparatus comprising:
an interface having an input and an output, the input configured to receive stator current values, the stator current values indicative of the current in the stator, the interface further configured to receive one or more rising or falling edges of magnetic field strength associated with the at least one rotating magnetic field device of the rotor at the input;
a memory including a pre-programmed data structure, the pre-programmed data structure storing a plurality of stator currents associated with a plurality of predetermined rotor positions;
a controller coupled to the interface and the memory, the controller configured to, when the rotor is moving below a threshold speed, receive the measured currents at the input, access the pre-programmed data structure stored in the memory, determine a first absolute position of the rotor from the data structure according to the measured current from each of the plurality of coils, and present the first absolute position at the output, the controller further configured, when the rotor is moving above a threshold speed to receive one or more rising or falling edges of magnetic field strength from the input, compare at least one timing aspect of the rising and falling edges of magnetic field strength to determine a second absolute position of the rotor, and present the second absolute position at the output of the interface.

14. The apparatus of claim 13 wherein the at least one rotating magnetic field device is selected from the group consisting of at least one of: a rotating magnetic ring; at least one magnet, and at least one magnetic coil.

15. The apparatus of claim 13 wherein the threshold speed is approximately zero.

16. The apparatus of claim 13 wherein the magnetic field device comprises a first and second magnetic ring and wherein the one or more falling or rising edges comprises first edges sensed with a first sensor associated with a first rotating ring and second edges sensed with a second sensor associated with a second rotating magnetic ring.

17. The apparatus of claim 16 wherein the first sensor comprises a Hall sensor.

18. The apparatus of claim 16 wherein the second sensor comprises two sensors in quadrature with each other.

19. The apparatus of claim 16 wherein the data structure comprises a look-up table.

20. The apparatus of claim 16 wherein the transmitted first absolute rotor position and the second absolute rotor position are transmitted to a vehicular electronic control unit.

21. The apparatus of claim 20 wherein the vehicular control unit is selected from the group consisting of: a steering control unit, an engine control function, a transmission control function, a hybrid motor control function, and an auxiliary motor control function.

22. A system for determining a position of a rotor of a motor, the motor including the rotor and a stator, the stator including a plurality of coils, the rotor further including at least one rotating magnetic field device, the system comprising:
a vehicular control unit configured to control at least one vehicular function;

at least one current sensor configured to detect current in the plurality of coils of the stator;

at least one magnetic field sensor disposed about the at least one rotating magnetic field device;

a rotor position determination unit coupled to the vehicular control unit, the at least one current sensor, and the at least one magnetic field sensor, the rotor position determination unit comprising:

an interface having an input and an output, the input configured to receive stator current values from the at least one current sensor, the stator current values indicative of the current in the stator, the interface further configured to receive one or more rising or falling edges of magnetic field strength associated with the at least one rotating magnetic field device of the rotor at the input from the at least one magnetic field sensor;

a memory including a pre-programmed data structure, the pre-programmed data structure storing a plurality of stator currents associated with a plurality of predetermined rotor positions;

a controller coupled to the interface and the memory, the controller configured to, when the rotor is moving below a threshold speed, receive the measured currents from the at least one current sensor at the input of the interface, access the pre-programmed data structure stored in the memory, determine a first absolute position of the rotor from the data structure according to the measured current from the at least one sensor, and transmit the first absolute position to the vehicular control unit via the output of the interface, the controller further configured, when the rotor is moving above the threshold speed to receive one or more rising or falling edges of magnetic field strength from the at least one magnetic field sensor at the input of the interface, compare at least one timing aspect of the rising and falling edges of magnetic field strength to determine a second absolute position of the rotor, and transmit the second absolute position to the vehicular control unit via the output of the interface.

23. The system of claim 22 wherein the threshold speed is approximately zero.

24. The system of claim 22 wherein the magnetic field sensor comprises at least one of a Hall sensor and two sensors in quadrature with each other.

25. The system of claim 22 wherein the data structure comprises a look-up table.

26. The apparatus of claim 22 wherein the vehicular control unit performs a function selected from the group consisting of: a steering control function, an engine control function, a transmission control function, a hybrid motor control function, and an auxiliary motor control function.

27. A vehicular operational component, the component comprising:

a vehicular operation module, the operational module being configured to provide a vehicle function; and a rotor position determination apparatus coupled to the vehicular operation module for determining a position of a rotor of a motor, the motor including the rotor and a stator, the stator including a plurality of coils, the rotor further including at least one rotating magnetic field device, the apparatus comprising:

an interface having an input and an output, the input configured to receive stator current values, the stator current values indicative of the current in the stator, the interface further configured to receive one or more rising or falling edges of magnetic field strength associated with the at least one rotating magnetic field device of the rotor at the input;

a memory including a pre-programmed data structure, the pre-programmed data structure storing a plurality of stator currents associated with a plurality of predetermined rotor positions; and a controller coupled to the interface and the memory, the controller configured to, when the rotor is moving below a threshold speed, receive the measured currents at the input, access the pre-programmed data structure stored in the memory, determine a first absolute position of the rotor from the data structure according to the measured current from each of the plurality of coils, and present the first absolute position at the output, the controller further configured, when the rotor is moving above a threshold speed to receive one or more rising or falling edges of magnetic field strength from the input, compare at least one timing aspect of the rising and falling edges of magnetic field strength to determine a second absolute position of the rotor, and present the second absolute position at the output of the interface.

28. The component of claim 27 wherein the at least one rotating magnetic field device is selected from the group consisting of at least one of: a rotating magnetic ring; at least one magnet, and at least one magnetic coil.

29. The component of claim 28 wherein the vehicular operation module provides a control function for another vehicle component 30. The component of claim 28 wherein the threshold speed is approximately zero.

31. The component of claim 28 wherein the magnetic field device comprises a first and second magnetic ring and wherein the one or more falling or rising edges comprises first edges sensed with a first sensor associated with a first rotating ring and second edges sensed with a second sensor associated with a second rotating magnetic ring.

32. The component of claim 31 wherein the first sensor comprises a Hall sensor.

33. The component of claim 31 wherein the second sensor comprises two sensors in quadrature with each other.

34. The component of claim 31 wherein the data structure comprises a look-up table.

35. The component of claim 31 wherein the transmitted first absolute rotor position and the second absolute rotor position are transmitted to a vehicular electronic control unit.

36. The component of claim 35 wherein the vehicular control unit is selected from the group consisting of: a steering control unit, an engine control function, a transmission control function, a hybrid motor control function, and an auxiliary motor control function.

* * * * *